United States Patent Office 3,291,564
Patented Dec. 13, 1966

3,291,564
METHOD OF TREATING EXHAUST GASES OF INTERNAL COMBUSTION ENGINES UTILIZING A STABILIZED ALUMINA CATALYST SUPPORT
Kenneth K. Kearby, Watchung, N.J., assignor to Esso Research and Engineering Company, a corporation of Delaware
No Drawing. Filed Aug. 31, 1962, Ser. No. 220,882
3 Claims. (Cl. 23—2)

This invention relates to an improved method for preparing stabilized alumina oxidation catalyst supports. More particularly, it relates to the use of novel and inexpensive materials to prepare a stabilized activated alumina catalyst support which when used with suitable catalysts has been found to be especially effective in the oxidation of automotive exhaust gas. Even more specifically, this invention relates to the use of alumina to which is added either a barium, cesium or potassium compound thereby forming an activated, stabilized catalyst support when calcined at elevated temperatures.

It has been well known that alumina is an excellent support for catalysts in a wide range of chemical reactions. In fact, in many cases alumina has been shown to have catalytic activity of its own and will therefore often enhance the activity of the catalyst it is supporting. It is further known that the activity of an alumina supported catalyst will be dependent on the surface area. For alumina, it is advantageous to retain a maximum surface area when the alumina is calcined to render it more stable against thermal changes. At very high temperatures a phase change may occur which converts the desirable eta or gamma phases into the less desirable theta or alpha phases, resulting in a great drop in the surface area. However, it is necessary to calcine the alumina at a high temperature, to make it stable, and to reduce its catalytic activity for undesirable side reactions.

It has now been found that the addition of potassium, barium or cesium compounds that will decompose to the respective oxide on heating will allow alumina to be calcined at elevated temperatures without the undesirable phase changes taking place. Furthermore, an unexpected benefit can be achieved by the use of this method in that relatively inexpensive grades of alumina can be activated and made useful as catalysts supports, whereas previously they have been considered less useful for this purpose.

The extremely severe conditions which prevail in the catalytic oxidation of carbon monoxide and hydrocarbons contained in the exhaust gases from internal combustion engines set unusually severe criteria for such catalysts, and this makes the selection of an effective catalyst extremely difficult. It is generally agreed that an effective catalyst should exhibit the following properties:

(a) Catalyst should be effective at a relatively low temperature so that it will function soon after the engine has started, i.e. it must have a short warm-up period.

(b) It should be highly efficient in oxidizing exhaust hydrocarbons and carbon monoxide.

(c) It should have a long life, i.e., (1) It should not be easily poisoned.
(2) It should withstand at least 1400° F. likely to develop during operation.
(3) It should not be abraded by the frequent shaking and occasional shocks characteristic of a moving vehicle.

Extensive research in this field has revealed that many catalysts will effectively oxidize the carbon monoxide and hydrocarbons contained in the exhaust gas from internal combustion engines. However, these catalysts have uniformly failed to be economically feasible in automotive afterburners due to their short life. The primary reason for this short life has been the ease with which these catalysts have been poisoned by the metallic compounds contained in the exhaust gases. Especially potent as a poison are the lead compounds from the antiknock additives in the fuel.

Addition of an appropriate metallic catalyst such as chromium and/or copper oxide to the alumina support described herein by one of the many methods known to the art, for example by impregnation, yields a very effective automobile engine exhaust gas oxidation catalyst.

An expensive form of alumina, e.g. alumina trihydrate prepared from an aluminum alcoholate, has been impregnated with several barium compounds and calcined at 1600° F. Barium chloride is most effective in stabilizing the alumina against losing surface area and going to the theta crystal form. After calcination the unreacted $BaCl_2$ may be washed out of the alumina before it is used as a catalyst support. Data in Table I show that addition of 2.5–5.0 mol percent Ba as the nitrate, acetate or hydroxide did not prevent the alcoholate from going to the theta crystal form, but did prevent some loss in surface area during the 1600° F. calcination. Addition of 5 mol percent $BaCl_2$ gave an eta form of alumina similar to that obtained when 2.5 mol percent of $Cs_2CO_3$ was added. Although cesium compounds are beneficial in stabilizing alumina, they are a less practical additive due to their higher cost.

Examination of Table I shows that the $BaCl_2$ product had a surface area of 112 square meters per gram as compared with 105 square meters per gram for the $Cs_2CO_3$ containing catalyst and 69 square meters per gram for the same alumina without any additive. The data in Table I also shows that addition of 2.5 and 5.0 mol percent of $K_2CO_3$, followed by calcination at 1600° F. for 10 hours, gave products with surface areas of 111 and 130 square meters per gram respectively.

These aluminas have alkaline rather than acid properties and therefore make especially excellent supports for Pt, Rh, Pd, $Cr_2O_3$, CuO, $CuO+Cr_2O_3$, $Ag+Cr_2O_3$, $V_2O_5$, NnO, $Co_2O_3$, etc. for aromatization and oxidation catalysts.

This invention will be better understood by reference to the following example describing the improved stabilization method.

EXAMPLE 1

Alumina was mixed with aqueous solutions containing 2.5 mols $Cs_2CO_3$ or 5.0 mols $BaCl_2$ per 100 mols $Al_2O_3$. The wet pastes were dried and calcined 16 hours at 1600° F. The $BaCl_2$ stabilized product was thoroughly washed with water. Catalysts were made by impregnating these stabilized aluminas with 18% $Cr_2O_3$, added as a $CrO_3$ solution, to form thick pastes, which were then dried and calcined at 1200° F. for 6 hours. The oxidation capacities of these catalysts were compared by using them with a simulated exhaust gas (0.17% isobutane, 2.4% CO, 3.0% $O_2$ in $N_2$). This gas was passed over the catalyst at 10,000 v./v./hr. S.T.P. and 1100° F. Conversions were determined for the oxidation of both carbon monoxide and isobutane. Then the temperature was increased to 1200° F. and a 0.5 gram pellet of lead bromide was dropped onto the 50 cc. bed of hot catalyst. After operating at 1200° F. for an additional hour, the temperature was reduced to 1100° F. and the conversions were again measured. The results are given in the following table:

PERCENT CONVERSION, 1100° F. 10,000 v./v./hr.

| Additive, Mol percent | 2.5 Mol percent $Cs_2CO_3$ | | 5 Mol percent $BaCl_2$ (Washed) | |
|---|---|---|---|---|
| $Cr_2O_3$, wt. percent | 18 | | 18 | |
| | CO | $iC_4$ | CO | $iC_4$ |
| Conversion, percent: | | | | |
| Before $PbBr_2$ | 94 | 96 | 90 | 99 |
| After 0.5 g. $PbBr_2$ | 92 | 92 | 83 | 93 |

Experimentation under the above conditions has shown that both catalysts can be improved, especially for converting carbon monoxide, by adding 1-20% CuO. Also, the proportions of $CrO_3$ may be varied from 1 to 40% but are preferably 5-20%. The use of $K_2CO_3$ in place of $Cs_2CO_3$ also yields an excellent oxidation catalyst of the type described above. These stabilized alumina-chromia catalyst may also be promoted by addition of 1-5% of silver. When Pt, Pd or Rh are used as oxidation components the amounts may be only 0.05 to 5.0%.

Experimentation also has shown that even better catalysts may be obtained when $BaCl_2$, $Cs_2CO_3$, or $K_2CO_3$ are added to the cheaper Filtrol alumina made by precipitation of aluminum sulfate with ammonium hydroxide. Furthermore, good catalysts have been obtained with even cheaper aluminas made by calcining selected purified Bauxite ores and other hydrated aluminas.

What is claimed is:

1. In a process of oxidizing carbon monoxide and hydrocarbons contained in internal combustion engine exhaust gases by passing said gases at elevated temperatures in the presence of oxygen into contact with a metal oxidation catalyst deposited on an activated alumina support, the improvement which comprises using as said support an alumina stabilized by about 2.5 to 5 mole percent of admixed barium chloride based on the alumina when the alumina is activated by calcination to the eta phase effective for preventing conversion of the eta phase alumina to theta phase alumina at elevated temperatures ranging up to 1600° F.

2. In the process as defined in claim 1, the alumina that is activated being hydrated alumina prepared from an aluminum alcoholate.

3. In the process as defined in claim 1, the alumina that is activated being hydrated alumina made by precipitation from an inorganic aluminum salt.

TABLE I.—STABILIZATION OF ALUMINA WITH ALKALINE ADDITIVES

| Alumina | Compound | Mol Percent | Hours | T., ° F. | Alumina Phase | Surface Area, m.²/g. |
|---|---|---|---|---|---|---|
| Al trihydrate ex alc | None | 0 | 10 | 1,450 | Theta | 104 |
| Do | do | 0 | 10 | 1,500 | do | 104 |
| Do | do | 0 | 10 | 1,550 | do | 99 |
| Do | do | 0 | 10 | 1,600 | do | 69 |
| Filtrol ex alum | do | 0 | 10 | 1,450 | Gamma | 167 |
| Do | do | 0 | 10 | 1,600 | Theta | 64 |
| Al trihydrate | $Cs_2CO_3$ | 2.5 | 10 | 1,600 | Eta | 105 |
| Do | $Ba(NO_3)_2$ | 2.5 | 10 | 1,600 | Theta | 70 |
| Do | $Ba(NO_3)_2$ | 5.0 | 10 | 1,600 | do | 64 |
| Do | $Ba(OAc)_2$ | 1.25 | 10 | 1,600 | do | 99 |
| Do | $Ba(OAc)_2$ | 2.5 | 10 | 1,600 | do | 109 |
| Do | $Ba(OH)_2$ | 2.5 | 10 | 1,600 | do | 94 |
| Do | $BaCl_2$ | 2.5 | 10 | 1,600 | Eta and Theta | 98 |
| Do | $BaCl_2$ [1] | 5.0 | 10 | 1,600 | Eta | 112 |
| Do | $K_2CO_3$ | 2.5 | 10 | 1,000 | Eta | 367 |
| Do | $K_2CO_3$ | 2.5 | 10 | 1,450 | Eta | 172 |
| Do | $K_2CO_3$ | 2.5 | 10 | 1,500 |  | 142 |
| Do | $K_2CO_3$ | 2.5 | 10 | 1,550 |  | 131 |
| Do | $K_2CO_3$ | 2.5 | 10 | 1,600 | Eta, tr Theta | 111 |
| Do | $K_2CO_3$ | 5.0 | 10 | 1,000 | Eta | 370 |
| Do | $K_2CO_3$ | 5.0 | 10 | 1,450 | Eta | 178 |
| Do | $K_2CO_3$ | 5.0 | 10 | 1,500 |  | 164 |
| Do | $K_2CO_3$ | 5.0 | 10 | 1,550 |  | 146 |
| Do | $K_2CO_3$ | 5.0 | 10 | 1,600 | Eta | 130 |
| Do | $K_2CO_3$ | 5.0 | 10 | 1,650 | Eta | 108 |
| Filtrol $Al_2O_3$ | $Cs_2CO_3$ | 2.5 | 10 | 1,600 | Eta | 133 |
| Do | $K_2CO_3$ | 2.5 | 10 | 1,600 | Eta | 147 |
| Do | $BaCl_2$ | 2.5 | 10 | 1,600 | Eta plus Gamma | 132 |

[1] Analysis: 4.6% BaO, 1.92% Cl; 3.1% BaO, 0.12% Cl (after $H_2O$ wash).

References Cited by the Examiner

UNITED STATES PATENTS

| | | | |
|---|---|---|---|
| 2,454,227 | 11/1948 | Smith et al. | 252—463 X |
| 2,897,161 | 7/1959 | Erickson | 252—465 |
| 2,912,300 | 11/1959 | Cannon et al. | 23—2 |
| 2,985,596 | 5/1961 | Pitzer | 252—465 |
| 2,991,160 | 7/1961 | Claussen | 23—2 |
| 3,025,132 | 3/1962 | Innes | 23—2.2 |
| 3,179,488 | 4/1965 | Appell | 23—2 |

MILTON WEISSMAN, *Primary Examiner.*

MAURICE A. BRINDISI, OSCAR R. VERTIZ,
*Examiners.*

E. C. THOMAS, *Assistant Examiner.*